Oct. 21, 1969 J. G. MINER 3,474,439
CHARACTER AND DECIMAL POINT GENERATOR
Filed Oct. 18, 1966
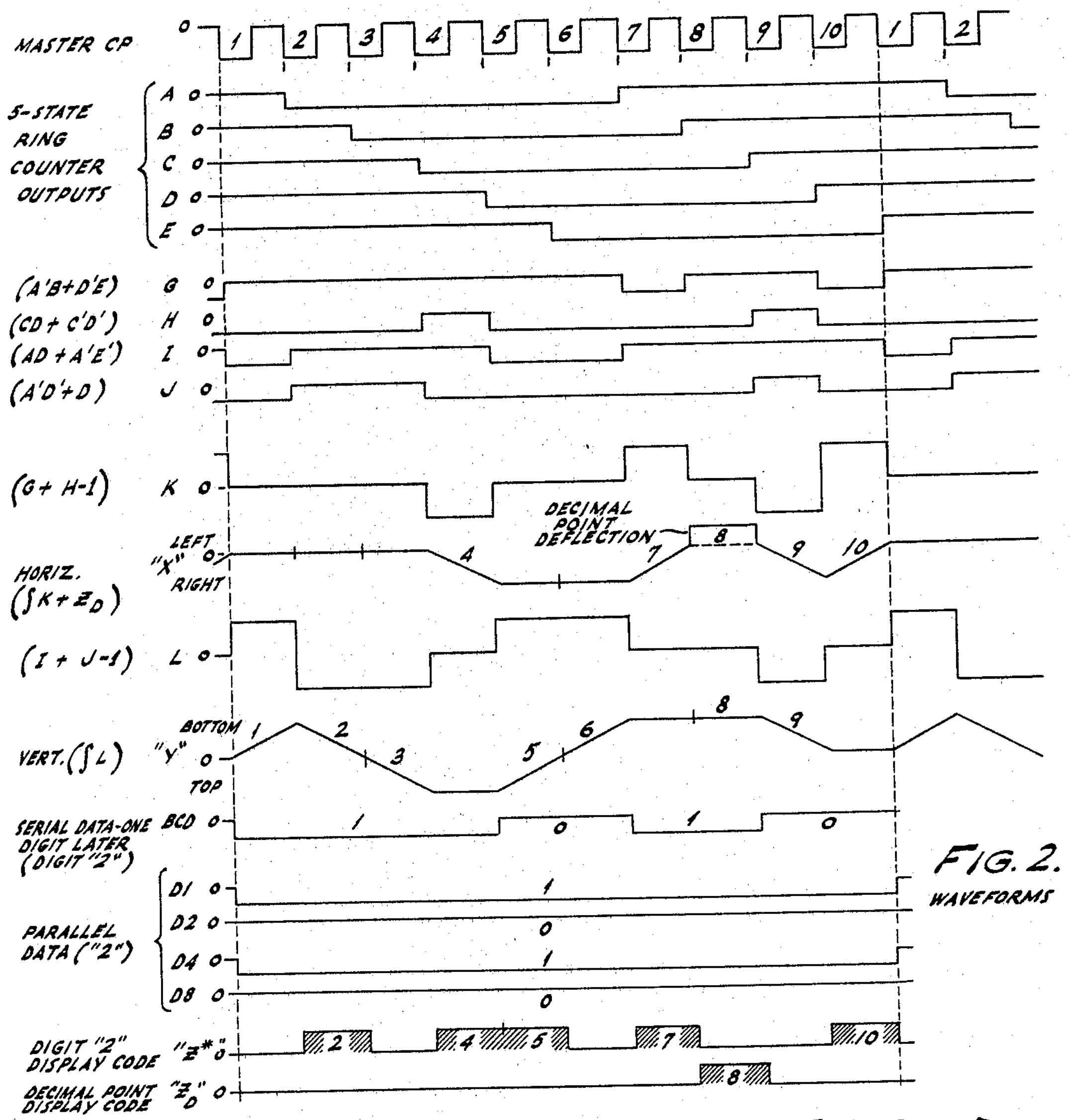
FIG. 2.
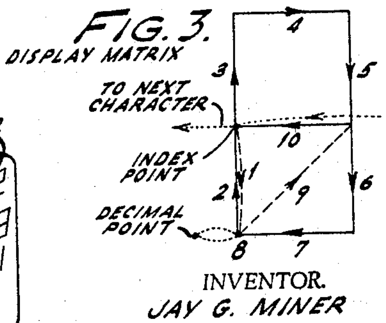
FIG. 3.
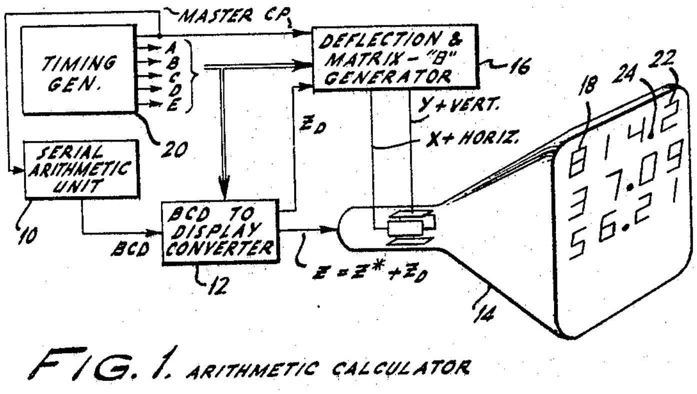
FIG. 1. ARITHMETIC CALCULATOR
INVENTOR.
JAY G. MINER
D R Pressman
ATTORNEY

1

3,474,439
CHARACTER AND DECIMAL POINT GENERATOR
Jay G. Miner, Sunnyvale, Calif., assignor to Philco-Ford Corporation, Philadelphia, Pa., a corporation of Delaware
Filed Oct. 18, 1966, Ser. No. 587,508
Int. Cl. G08b *23/00*
U.S. Cl. 340—324 5 Claims

ABSTRACT OF THE DISCLOSURE

Character and decimal point generator using an electron beam to generate on the faceplate of a cathode ray tube a series of connected strokes to form a master character display matrix. Different characters are formed from said matrix by blanking selected strokes thereof. During one stroke interval of the matrix, the electron beam normally is blanked and its position is fixed at the bottom of the matrix. When a decimal point is to be generated adjacent the matrix, the beam is unblanked for this interval and its position is displaced to the left of the matrix so as to form the decimal point.

This invention relates to character generator and more particularly to a character generator of the type which utilizes a dynamic display device (such as cathode ray tube) in which a decimal point may be generated adjacent to a displayed character in a novel and advantageous manner.

In one type of serial arithmetic calculator or computer, a recirculating storage unit is used to provide a temporary memory during a calculation mode and a recurring drive for a dynamic output display unit during a display mode. The dynamic display device uses a temporary display medium, such as the faceplate of the cathode ray tube, across which decimal numbers (0 to 9) are written by an electron beam. The X-axis (horizontal) and Y-axis (vertical) inputs of the cathode ray tube are driven by a recurring deflection voltage which is arranged to cause an electron beam, when generated at the cathode of the CRT, to trace a plurality of rows of master decimal matrix characters across the faceplate of the CRT. Each of these matrix characters consists of a figure such as an "8" which can be converted into any other decimal character by erasing or filling in certain portions thereof. This is accomplished by an input signal supplied to the Z-axis (intensity) input of the CRT. The Z signal unblanks (turns on) the electron beam at the proper times. A display converter is provided to convert the binary information (ONES and ZEROES) circulating in the arithmetic unit of the calculator to a suitable Z or unblanking signal for application to the Z-axis input of the CRT.

In addition to writing decimal characters across the faceplate of the CRT, the display device must be capable of providing decimal points adjacent a selected character in a row of decimal digits. Previous methods for generating such decimal points were far from satisfactory. In particular, the decimal point was usually subject to erratic jitter or random motion with respect to its adjacent decimal character. In addition, the position of the decimal point was not always correctly centered between characters as it should be, but often was completely lost because it overlapped a character. Further, the prior art methods of generating the decimal point were usually quite complicated and unreliable in operation.

These difficulties are attributable to the prior art methods of generating the decimal point. For example, in one prior art system the decimal point was not generated concomitantly with its adjacent character, but was generated during the retrace interval of the electron beam or during

2 a separate sweep interval. Thus it was very difficult to maintain accurate registry between the decimal point and its adjacent character. In addition, a critical timing tolerance was required to unblank the electron beam at the proper time in prior art systems.

Accordingly several objects of the present invention are: (1) to provide a new and improved character and decimal point generator; (2) to provide a character and decimal point generator in which the decimal point does not jitter with respect to its adjacent character; (3) to provide a character and decimal point generator in which accurate registry between the decimal point and its adjacent character is maintained; and (4) to provide a character and decimal point generator in which the circuitry for generating the decimal point is simple and reliable.

Other objects and advantages of the present invention will become apparent from a consideration of the ensuing description thereof.

SUMMARY

According to the present invention a decimal point is generated in association with an adjacent displayed decimal character by generating a master decimal character matrix for a dynamic display medium in a series of strokes. After one of the strokes the writing element is selectively either (1) maintained in position and blanked for a stroke interval, or (2) deflected to a position adjacent the character matrix and unblanked for the stroke interval, thereby to generate a decimal point.

DRAWINGS

FIG. 1 shows an arithmetic calculator including the dynamic display device of the present invention.

FIG. 2 shows a series of waveforms used in said calculator and said dynamic display device.

FIG. 3 shows a master decimal character display matrix according to the invention which is used in said display device.

FIG.1.—ARITHMETIC CALCULATOR

The calculator shown in FIG. 1 comprises a recirculating serial arithmetic unit 10 which is arranged to receive digital data from an input unit (not shown) and perform a desired arithmetic operation or operations on said data. The arithmetic unit 10 includes one or more shift registers through which binary-encoded serial data circulates in order to provide temporary storage thereof during arithmetic calculation operations and to provide a recurrent drive for a dynamic output display unit during the display mode which occurs after the arithmetic operations are completed.

When the calculator completes its assigned arithmetic operations, it supplies data for display purposes in the form of a binary-coded decimal (BCD) signal to a BCD-to-decimal display code converter 12 which is arranged to convert the BCD signal to a suitable decimal unblanking code for driving the Z-axis input of a dynamic display unit comprising a cathode ray tube 14. The X and Y axes of CRT 14 are driven by a deflection and matrix "8" pattern generator 16 which is arranged to cause an electron beam originating at the cathode of CRT 14 to trace out a series of rows of master decimal matrix symbols comprising numeral "8's" such as shown at 18 on the faceplate of CRT 14 and in FIG. 3. Converter 12 supplies an unblanking signal to the Z-axis of CRT 14 which turns on the electron beam at the proper times so as to change the master decimal matrix into the particular decimal digits represented by the BCD signal which is supplied to converter 12.

All of the components of the calculator are driven in synchronism by a timing generator 20 which supplies master clock pulses to generator 16 and arithmetic unit 10. In generator 16 the master clock pulses are utilized to generate horizontal and vertical staircase deflection signals which cause the electron beam to step between index points of adjacent characters in a row and between adjacent rows in well-known manner. In arithmetic unit 10, the master clock pulses clock the operation of the arithmetic unit and its associated recirculating storage unit. Optionally, the arithmetic unit 10 may be driven by an aperiodic train of clock pulses derived from the master clock pulses in the manner shown and discussed in the co-pending application of J. G. Miner and H. Z. Bogert, entitled "Aperiodic Arithmetic Calculator," now Patent 3,447,136, granted May 27, 1969.

Generator 20 also supplies five signals, A to E, which are used by generator 16 to generate the aforementioned X and Y matrix signals and which are used by converter 12 to convert the BCD output of arithmetic unit 10 to a suitable unblanking code for application to the Z-axis input of CRT 14.

FIG. 2.—CALCULATOR WAVEFORMS

FIG. 2 shows time v. voltage amplitude plots of various signal waveforms in a calculator of FIG. 1. At the top of FIG. 2 is shown the master clock pulse train which is supplied by generator 20. The master clock pulse train comprises a series of negative pulses which in one construction of the invention had a 50% duty cycle and a frequency of 330 kHz. Optionally, as discussed in the co-pending application H. Z. Bogert and J. G. Miner, entitled "Two-Speed Arithmetic Calculator," now Patent 3,453,-601, granted July 1, 1969, the master clock pulses may have different frequencies during the calculating and display modes of operation, respectively, in order to save power and increase calculating speed. The time interval between leading edges of adjacent pulses in the master clock pulse train defines a stroke interval (the time required to produce one stroke of the master matrix character) while every ten clock pulses define a digit interval (the time required to produce a single master matrix character).

In the timing generator 20 the master clock pulses are supplied to a five state ring counter (not shown) which supplies the five signals A to E which are shown below the master clock pulses. Signals A to E are each one-tenth the frequency of the master clock pulses, have a duty cycle of 50%, and are phased so that each of the four signals B to E occurs one stroke interval later than its preceding signal, while signal A occurs six stroke intervals after signal E.

In generator 16 the X and Y matrix signals are generated from an A to E signal as follows: The A to E signals are first combined logically in according to the four formulas given in the left-hand side of FIG. 2 opposite waveforms G to J to generate four synthesizing signals G to J. Signals G and H are then added algebraically and the sum is given a negative level shift to produce signal K, while signals I and J are also added algebraically and given a negative level shift to produce waveform L. Signal L is then integrated to yield the "Y" signal shown. Signal K is also integrated and the integral is added with a signal $Z_D$ (shown at the bottom of FIG. 2) to yield the "X" signal shown. The $Z_D$ signal provides a positive pulse for the duration of the eighth stroke interval when a decimal point is to be generated adjacent the displayed character. Thus if no decimal point is to be generated, the "X" signal will have a zero value during the eighth stroke interval as indicated by the dashed line, and when a decimal point is to be generated, the X signal will have a positive value during the eighth interval as indicated by the solid line.

FIG. 3.—DISPLAY MATRIX

The master decimal character matrix of FIG. 3 is generated by the X and Y signals as follows. Initially the electron beam travels from an index point on a preceding character to the right of the present character (or from a row of characters below the present row if the present character is the last character on the right of the row) in a rapid manner under control of the horizontal deflection staircase signal. This path is indicated by the horizontal dotted line in FIG. 3 which is drawn curved in order to separate it from the actual lines of the matrix; in reality the path of the beam is straight between index points and of course the beam is always blanked when the horizontal or vertical staircase deflection signals are operative.

When the beam reaches the index point of the present character, the horizontal staircase deflection signal rests for one digit interval and the X and Y signals take over. The X signal remains at zero for the first three strokes, but the Y signal rises during the first stroke, creating a deflection force which will cause an electron beam to go to the bottom left-hand corner of the character as indicated by the dashed line which is drawn curved in order to separate it from the second stroke so as to show the two strokes clearly. This first stroke actually is linear and is always blanked. During the second and third stroke intervals, the Y signal proceeds from its positive value to its most negative value, causing the beam to travel from the lower left-hand corner to the upper left corner of the character. The Y signal remains unchanged during the fourth stroke interval, while the X signal proceeds to a negative value, causing the beam to go to the upper right corner of the character. During the fifth and sixth stroke intervals, the X signal remains unchanged, but the Y signal goes from its most negative to its most positive value, causing the beam to travel from the upper right corner to the lower right corner of the character. During the seventh stroke, the Y signal is unchanged, but the X signal goes from its negative value to zero, causing the beam to move from the lower right-hand corner to the lower left-hand corner of the character.

If no decimal point is to be generated adjacent the character, the X and Y signals will both remain unchanged and the beam will be blanked during the eighth stroke interval. Thus the blanked beam position will dwell at the lower left-hand corner of the character for the eighth stroke interval when no decimal point is to be generated.

However if a decimal point is to be generated to the left of the character, the $Z_D$ output lead of converter 12 will supply during the eighth stroke interval a positive pulse having an amplitude approximately equal to one-half the amplitude of a step in the horizontal sawtooth deflection waveform. Since the $Z_D$ signal is added to the integral of the K signal to produce the X signal, the X signal will have a positive value during the eighth stroke interval as shown by the solid line. This positive value will deflect the electron beam to a position the left of the matrix for the full eighth stroke interval to generate the decimal point shown. The $Z_D$ signal is also supplied (along with a Z* signal) to the Z-axis input of converter 14 in order to unblank the beam for the eighth stroke interval when the decimal point is to be generated.

At the end of the eighth stroke interval, whether or not a decimal point has been generated, the beam position will be at the lower left-hand corner of the character. During the ninth stroke interval the beam is always blanked, but the X and Y signals both go in a negative direction, causing the blanked beam position to trace a diagonal path to the center of the right-hand side of the corner. During the tenth stroke interval the Y signal is unchanged but the X signal goes to zero, causing the beam to generate a horizontal stroke, thereby returning the beam to the original index point at the center of the left-hand side of the character. Thereafter the horizontal staircase deflection signal will cause the beam rapidly to travel to the index point on the next character where the foregoing ten strokes will be repeated in an identical manner in the next digit interval.

It will be appreciated that since the decimal point is generated effectively as part of the master decimal character matrix, registry of the decimal point at a location to the left of a displayed character will be relatively easy to effect by merely controlling the amplitude of the $Z_D$ signal. Thus the decimal point will not jitter with respect to the character and will not overlap the character as often occurred in prior art systems. The foregoing manner of generating the decimal point is extremely simple and reliable, as will be appreciated by those skilled in the art.

BCD to Display Converter 12

Converter 12 of FIG. 1 combines the BCD signal from arithmetic unit 10 with the A to E signals in order to generate suitable unblanking codes for application to the X-axis input of CRT 14 as follows: For exemplary purposes it will be assumed that the BCD signal during the digit interval preceding the full digit interval shown in FIG. 2 represents the decimal number "2" in the "excess three" binary code. In the excess three code, the bits of the binary word represent factors of successive powers of two in a series whose sum is greater by three than the encoded decimal number. Thus when the BCD signal represents the decimal "2," the binary number "1010" will be supplied, since $1\times2^0+0\times2^1+1\times2^2+0\times2^3=5$, and $5-3=2$. The BCD signal, which is shown in FIG. 2 one digit time later than its actual occurrence, is aperiodic (the first bit is longer than the second, third, and fourth bits) in order to have the leading edges thereof coincide with leading edges of the master clock pulse train, as discussed more fully in the aforementioned Bogert-Miner application, Ser. No. 587,462.

In converter 12 the BCD signal is supplied to a serial to parallel converter (not shown) which converts said signal into four binary signals, D1, D2, D4, and D8, which are shown in FIG. 2 below the BCD signal. A suitable serial-to-parallel converter is shown in FIG. 4 of the aforementioned Bogert-Miner application, Ser. No. 587,-462. The parallel binary signals D1, D2, D4, and D8 are combined in converter 12 with the A to E signals in logic circuitry (not shown) to provide, selectively, a corresponding one of ten decimal unblanking signals 0 to 9 in accordance with the following Boolean equations:

$0=A+B+D1'+D2'+D4+D8$
$1=AD+D1+D2+D4'+D8$
$2=AB'+CE'+A'B+D'E+D1'+D2+D4'$
$3=BC+D'E+D1+D2'+D4'$
$4=BC'+AD+D'E+D1'+D2'+D4'$
$5=BD'+BE+D'E+D1+D2+D4+D8'$
$6=AD'+BE+D'E+D1'+D2+D8'$
$7=AC+D1+D2'+D8'$
$8=A+B+D'E+D1'+D2'+D8'$
$9=B+D'E+D4'+D8'$

It can be shown that each of the above decimal signals will be the correct signal required to generate the corresponding number in CRT 14 by unblanking selected strokes of the matrix of FIG. 3. In the example under consideration in which the BCD input to converter 12 represents the decimal number "2," the correct unblanking signal for application to the Z-axis input of the CRT 14 will be generated at a "2" terminal in converter 12, while all of the other decimal terminals therein, 0, 1, and 3 to 9, will not be energized during the entire digital interval. The decimal signals 0 to 9 are combined in an OR gate to provide an inverted polarity unblanking signal which is inverted in polarity to provide a signal designated Z* (shown in FIG. 2) which will be the correct unblanking signal for application to the Z-axis input of CRT 14 to generate any decimal number represented by the BCD input to converter 12. It will be noted that this signal is positive during the second, fourth, fifth, and tenth stroke intervals. Thus the electron beam will be turned on during these stroke intervals so that the corresponding strokes of the master decimal matrix will be illuminated to display a "2" such as indicated at 22 on the faceplate of CRT 14.

When a decimal point is to be generated to the left of the character, such as shown at 24 on the faceplate of CRT 14, the BCD input to converter 12 will include a suitable decimal point position code signal preceding the binary word signals representative of a row of characters. This decimal point position signal will represent the number of the character position in the row adjacent which the decimal point is to be generated. This information will set a binary word counter in converter 12 to the number of the correct character position, so that after one less than the correct number of binary words have been supplied, the counter will supply a gating signal for the entire digit interval in which the decimal point is to be generated. This gating signal may be identical to the D1 signal of FIG. 2, for example. A separate signal is generated from two of the ring counter outputs according to the logic B'C to provide a pulse during every eighth stroke interval. The gating signal and the B'C signal are supplied to an AND gate. Thus the output of the AND gate will be a signal which, when inverted will be the $Z_D$ signal. As stated, the $Z_D$ signal will supply a pulse only during the digit interval when the decimal point is to be generated. The $Z_D$ signal is combined in an OR gate with the aforediscussed Z* signal to generate a signal Z, not shown, for application to the cathode of CRT 14. Also the $Z_D$ signal is supplied to generator 16 where it is added to the integrated version of the K signal to generate the "X" signal for application to the horizontal plate of CRT 14.

It will be understood that the above described particular manner of generating the signals which are supplied to generator 16 and CRT 14 are exemplary only and are not to be considered as limiting the present invention, which is directed to a novel character and decimal point displayer.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

I claim:

1. A character generator, comprising:

(a) a source of clock pulses, the temporal spacing between adjacent ones of said pulses defining an interval, (b) means controllable to generate a decimal point display signal, (c) a cathode ray tube, Z-axis means responsive to an input signal to cause generation of an electron beam within said tube, X-axis means for deflecting said electron beam along a given path, Y-axis means for deflecting said electron beam along another path orthogonal to said given path, (d) means for supplying, in response to an integral number of said clock pulses, a pair of signals to said X-axis and Y-axis means for (1) causing said electron beam to trace a master decimal character matrix on the screen of said tube in a series of strokes, each of said strokes being generated in one of said intervals, and (2) causing said beam to remain in a fixed position for one of said intervals at the completion of one of said strokes in the absence of said decimal point display signal and for causing said beam to be deflected to a point adjacent said matrix for said one interval in response to said decimal point display signal, and (e) means for supplying a signal to said Z-axis means (1) for causing generation of said electron beam during selected ones of said intervals so as to form from said matrix a decimal character, and (2) for causing generation of said electron beam during said one interval in response to said decimal point display signal.

2. The character generator of claim 1 wherein said matrix is the decimal digit "8" and said one interval occurs when said electron beam is at a bottom corner of said character.

3. The character generator of claim 1 wherein said (d) means also comprises means for generating a row of said matrix characters seriatim across the screen of said cathode ray tube, each matrix character being generated in response to said integral number of said clock pulses, and wherein said (e) means comprises means for supplying a plurality of unblanking signals seriatim to the Z-axis input of said tube for changing selected ones of said matrix characters into decimal characters.

4. The character generator of claim 3 wherein each of said matrix characters recited in clause (d) is the decimal digit "8" and wherein said integral number recited in clause (d) is ten.

5. The character generator of claim 1 wherein said matrix character recited in clause (d) is the decimal digit "8" and said integral number recited in clause (d) is ten, said (d) means comprising means for causing said electron beam to generate said "8" in the following strokes: (1) from an index point at the center of one side of said rectangle downward to the bottom of said rectangle, (2) upward to said index point, (3) upward to the top of said rectangle, (4) horizontally to the other side of said rectangle, (5) downward to the center of said rectangle, (6) downward to the bottom of said rectangle, (7) horizontally to said one side of said rectangle, (8) stationary in the absence of said decimal point display signal, and, in the presence of said decimal point display signal, horizontally to a point adjacent said rectangle for the duration of one of said clock pulses and then horizontally to its position at the conclusion of stroke (7), (9) diagonally upward to the center of said other side of said rectangle, and (10) horizontally to said index point.

References Cited

UNITED STATES PATENTS

| | | | |
|---|---|---|---|
| 3,104,387 | 9/1963 | Loshin | 340—324.1 |
| 3,296,609 | 1/1967 | Wilhelmsen | 340—324.1 |
| 3,309,692 | 3/1967 | Wilhelmsen | 340—324.1 |
| 3,341,838 | 9/1967 | Ragen | 340—324.1 |

JOHN W. CALDWELL, Primary Examiner

M. M. CURTIS, Assistant Examiner

U.S. Cl. X.R.

340—336